J. M. KAPLAN.
HEAD REST.
APPLICATION FILED FEB. 3, 1912.
1,033,905.
Patented July 30, 1912.
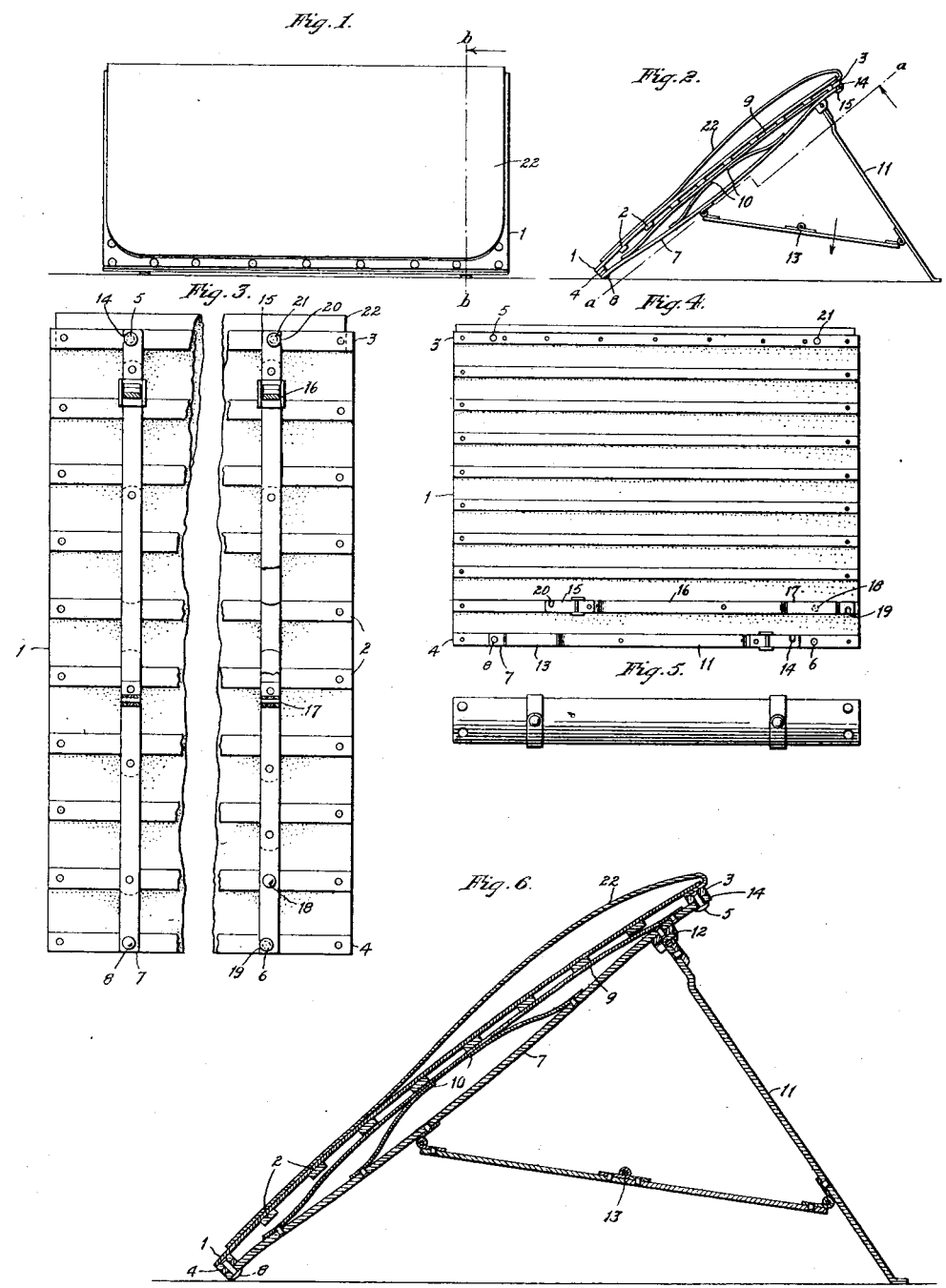

UNITED STATES PATENT OFFICE.

JAK M. KAPLAN, OF CHICAGO, ILLINOIS.

HEAD-REST.

1,033,905.  Specification of Letters Patent.  Patented July 30, 1912.

Application filed February 3, 1912. Serial No. 675,384.

*To all whom it may concern:*

Be it known that I, JAK M. KAPLAN, a subject of Russia, residing at Chicago, in the county of Cook and State of Illinois, have invented certain new and useful Improvements in Head-Rests, of which the following is a specification.

The object of this invention is to construct a head rest which is adapted to be rolled when not in use, and when extended will form a yieldable head rest.

In the accompanying drawings, Figure 1 is a front elevation in which the head rest is extended. Fig. 2 is a side elevation. Fig. 3 is a section on line *a a* Fig. 2. Fig. 4 is an underface view in which the supports are in position to be rolled. Fig. 5 shows the head rest rolled. Fig. 6 is a section on line *b b* Fig. 1.

The head rest comprises a flexible front 1 to the underside of which are riveted center metallic strips 2 and end metallic strips 3 and 4. The strip 3 supports two headed studs 5 and 21, and the strip 4 supports a headed stud 6. To the end strip 4 is pivoted a bar 7 by the rivet 8. To this bar is riveted a main spring bar 9, also two auxiliary spring bars 10 which support the center portion of the main spring bar 9. To the bar 7 is pivoted a leg 11 having its end 12 turned to form a stop. Toggle levers 13 are pivotally connected, one lever having a pivotal connection with the bar 7, and the other lever pivotally connected with the leg 11. The free end of the bar 7 is formed with a slot 14. A bar 15, main spring-bar and auxiliary spring-bars (not shown), leg 16 and toggle levers 17, similar to like parts above described are connected to one of the intermediate bars 2 in a pivotal manner by the rivet 18. One end of the bar 15 has a slot 19, and its other end has a slot 20.

When the head rest is extended for use, the bar 7 is turned on its pivot 8 across the intermediate bars 2, and the headed stud 5 received in the slot 14. The bar 15 is turned on its pivot 18 across the intermediate bars 2, the headed stud 6 is received in the slot 19, and the headed stud 21 is received in the slot 20. The legs 11 and 16 are unfolded and prevented from too great a movement by the toggle levers, as shown at Figs. 2 and 6. The main and auxiliary springs support the intermediate bars 2, connected to the flexible front 1. The bars 7 and 15 serve to hold the flexible front 1 extended, and the springs impart a yielding movement to the front.

In Fig. 4, the bars 7 and 15 with their springs, legs and toggle levers are shown turned lengthwise of the bar 4, and the intermediate bar 2 next to the bar 4, which will allow the pillow to be rolled as shown at Fig. 5.

A protector 22, has an end connected to the bar 3, and loose at its other end. This protector is employed to shield the head from the sun rays when the head rest is in use.

This head rest is particularly useful in outing and camping.

I claim as my invention.

A head rest comprising a flexible front, strips connected to the front, bars pivotally connected to the strips at one end of the front adapted to connect with the strip at the other end of the front, legs connected to the bars, toggle levers connecting the legs with the bars, and springs connected to the bars and adapted to support the front.

In testimony whereof I have hereunto set my hand in presence of two subscribing witnesses.

JAK M. KAPLAN.

Witnesses:
A. O. BEHEL,
E. D. E. N. BEHEL.